(12) United States Patent
Yamada et al.

(10) Patent No.: US 7,732,982 B2
(45) Date of Patent: Jun. 8, 2010

(54) DRIVING DEVICE CAPABLE OF REDUCING HEIGHT THEREOF

(75) Inventors: Tsukasa Yamada, Kanagawa (JP); Soumei Takahashi, Tokyo (JP)

(73) Assignee: Mitsumi Electric Co., Ltd., Tama-Shi (JP)

(*) Notice: Subject to any disclaimer, the term of this patent is extended or adjusted under 35 U.S.C. 154(b) by 223 days.

(21) Appl. No.: 12/148,257

(22) Filed: Apr. 17, 2008

(65) Prior Publication Data

US 2008/0258579 A1    Oct. 23, 2008

(30) Foreign Application Priority Data

Apr. 19, 2007    (JP) ............................. 2007-110283

(51) Int. Cl.
*H02N 2/00* (2006.01)
(52) U.S. Cl. .......................... 310/323.17; 310/323.01
(58) Field of Classification Search ............ 310/323.01, 310/323.02, 323.17
See application file for complete search history.

(56) References Cited

U.S. PATENT DOCUMENTS

| | | | |
|---|---|---|---|
| 3,941,903 A | 3/1976 | Tucker | |
| 4,786,836 A | 11/1988 | Tokushima | |
| 4,830,500 A | 5/1989 | Kuroki et al. | |
| 5,225,941 A | 7/1993 | Saito et al. | |
| 5,442,166 A | 8/1995 | Hollmann | |
| 5,589,723 A | 12/1996 | Yoshida et al. | |
| 5,821,441 A | 10/1998 | Kawamura | |
| 5,890,391 A | 4/1999 | Okada | |
| 6,084,363 A | 7/2000 | Mizumoto | |
| 6,111,336 A | 8/2000 | Yoshida et al. | |
| 6,114,799 A | 9/2000 | Yoshida et al. | |
| 6,140,750 A | 10/2000 | Ueyama | |
| 6,188,161 B1 | 2/2001 | Yoshida et al. | |
| 6,232,697 B1* | 5/2001 | Mizumoto | ................... 310/317 |
| 6,392,827 B1* | 5/2002 | Ueyama et al. | ............. 359/824 |
| 6,492,637 B1 | 12/2002 | Fujita | |
| 6,528,926 B2 | 3/2003 | Okamoto et al. | |
| 6,856,072 B2 | 2/2005 | Kosaka et al. | |

(Continued)

FOREIGN PATENT DOCUMENTS

EP    1 605 290 A2    12/2005

(Continued)

OTHER PUBLICATIONS

Extended European Search Report dated Nov. 4, 2009 issued in counterpart European Appln. No. 08154796.0.

(Continued)

*Primary Examiner*—Thomas M Dougherty
(74) *Attorney, Agent, or Firm*—Frishauf, Holtz, Goodman & Chick, P.C.

(57) ABSTRACT

A driving device includes an electro-mechanical transducer having first and second end portions opposite to each other in an expansion/contraction direction, a stationary member coupled to the first end portion of the electro-mechanical transducer, a vibration friction portion mounted to the second end portion of the electro-mechanical transducer, and a rod-shaped moving portion frictionally coupled to the vibration friction portion, whereby moving the moving portion in the expansion/contraction direction of the electro-mechanical transducer. A frictionally coupled portion has a height (a length of the vibration friction portion in a sliding direction in contact with the moving portion) which is not more than 1.15 mm.

8 Claims, 8 Drawing Sheets

U.S. PATENT DOCUMENTS

| | | | |
|---|---|---|---|
| 7,157,830 | B2 | 1/2007 | Jansson et al. |
| 7,173,363 | B2 | 2/2007 | Hendriks et al. |
| 7,199,506 | B2 | 4/2007 | Sasaki et al. |
| 7,271,522 | B2 | 9/2007 | Yuasa et al. |
| 7,342,347 | B2 | 3/2008 | Magnussen et al. |
| 7,355,325 | B2 | 4/2008 | Johansson et al. |
| 7,355,802 | B2 | 4/2008 | Homme |
| 7,368,854 | B2 * | 5/2008 | Manabe ................. 310/323.17 |
| 7,433,138 | B2 | 10/2008 | Sasaki |
| 7,466,949 | B2 | 12/2008 | Satoh et al. |
| 7,531,941 | B2 | 5/2009 | Manabe |
| 2002/0038988 | A1 | 4/2002 | Matsuo et al. |
| 2002/0109434 | A1 | 8/2002 | Seki |
| 2004/0000903 | A1 | 1/2004 | Morimoto |
| 2004/0216589 | A1 | 11/2004 | Amick |
| 2005/0127789 | A1 | 6/2005 | Magnussen et al. |
| 2005/0242688 | A1 | 11/2005 | Yuasa et al. |
| 2005/0275315 | A1 | 12/2005 | Manabe et al. |
| 2006/0103266 | A1 | 5/2006 | Okamoto |
| 2006/0238075 | A1 | 10/2006 | Manabe et al. |
| 2007/0036533 | A1 | 2/2007 | Sasaki |
| 2007/0036534 | A1 | 2/2007 | Sasaki et al. |
| 2007/0075610 | A1 | 4/2007 | Manabe et al. |
| 2007/0096601 | A1 | 5/2007 | Sueyoshi et al. |
| 2008/0196815 | A1 | 8/2008 | Yamada et al. |
| 2009/0027785 | A1 | 1/2009 | Tanaka et al. |
| 2009/0146602 | A1 | 6/2009 | Kikuchi et al. |

FOREIGN PATENT DOCUMENTS

| | | | |
|---|---|---|---|
| EP | 1 755 176 | A2 | 2/2007 |
| EP | 1 845 607 | A | 10/2007 |
| JP | 6-174999 | A | 6/1994 |
| JP | 7-49442 | A | 2/1995 |
| JP | 2633066 | B2 | 4/1997 |
| JP | 9-191665 | A | 7/1997 |
| JP | 10-023771 | A | 1/1998 |
| JP | 10-337057 | A | 12/1998 |
| JP | 3002890 | B2 | 11/1999 |
| JP | 3141714 | B2 | 12/2000 |
| JP | 3171000 | B2 | 3/2001 |
| JP | 3180557 | B2 | 4/2001 |
| JP | 3212225 | B2 | 7/2001 |
| JP | 3218851 | B2 | 8/2001 |
| JP | 2003-185406 | A | 7/2003 |
| JP | 2005-218244 | A | 8/2005 |
| JP | 2006-5998 | A | 1/2006 |
| JP | 2006-54979 | A | 2/2006 |
| JP | 2006-113155 | A | 4/2006 |
| JP | 2006-113874 | A | 4/2006 |
| JP | 2006-304529 | A | 11/2006 |
| WO | WO 2006/059459 | A | 6/2006 |
| WO | WO 2007/013349 | A1 | 2/2007 |

OTHER PUBLICATIONS

Non-final Office Action dated Sep. 22, 2009 issued in *related* U.S. Appl. No. 12/148,252. (13 pages).
Extended European Search Report and Written Opinion dated Sep. 4, 2009 issued in a counterpart European application No. 08 15 4797 of *related* U.S. Appl. No. 12/148,253. (6 pages).
Extended European Search Report and Written Opinion dated Aug. 31, 2009 issued in a counterpart European application No. 08 15 4485 of *related* U.S. Appl. No. 12/082,947. (8 pages).
Extended European Search Report and Written Opinion dated Sep. 3, 2009 issued in a counterpart European application No. 08 15 4774 of *related* U.S. Appl. No. 12/148,252. (9 pages).
Extended European Search Report dated Sep. 1, 2009 (8 pages), issued in European Application Serial No. 08154734.1 (which is a counterpart of *related* U.S. Appl. No. 12/082,948).
Notice of Allowance dated Aug. 11, 2009, issued in *related* U.S. Appl. No. 12/082,939.
Notice of Allowance dated Aug. 7, 2009, issued in *related* U.S. Appl. No. 12/082,948.
Office Action dated Mar. 12, 2009, issued in *related* U.S. Appl. No. 12/082,947.
Office Action dated May 14, 2009, issued in *related* U.S. Appl. No. 12/148,793.
U.S. Appl. No. 12/082,939, filed Apr. 15, 2008, Entitled "Driving Device Capable of Obtaining a Stable Frequency Characteristic" Inventor: Takahashi et al.
U.S. Appl. No. 12/082,947, filed Apr. 15, 2008, Entitled "Driving Device Capable of Improving a Shock and Vibration Resistance Thereof" Inventor: Nishiyama et al.
U.S. Appl. No. 12/082,948, filed Apr. 15, 2008, Entitled "Driving Device Capable of Transferring Vibrations Generated by an Electro-Mechanical Transducer to a Vibration Friction Portion with a High Degree of Efficiency" Inventor: Yamada et al.
U.S. Appl. No. 12/148,252, filed Apr. 17, 2008, Entitled "Driving Device Having Suitable Stationary Member as Material" Inventor: Yamada et al.
U.S. Appl. No. 12/148,253, filed Apr. 17, 2008, Entitled "Method of Driving a Driving Device" Inventor: Tanaka et al.
U.S. Appl. No. 12/148,793, filed Apr. 22, 2008, Entitled "Position Detecting Device Capable of Improving Detection Accuracy" Inventor: Tanaka et al.
Extended European Search Report dated Sep. 9, 2008 issued in European Application No. 08154985.9-2213 (which is a counterpart of related U.S. Appl. No. 12/148,793).

* cited by examiner

DRIVING DEVICE CAPABLE OF REDUCING HEIGHT THEREOF

This application is based upon and claims the benefit of priority from Japanese Patent Application JP 2007-110283, filed on Apr. 19, 2007, the disclosure of which is incorporated herein in its entirety by reference.

BACKGROUND OF THE INVENTION

This invention relates to a driving device (a linear actuator) and, in particular, to a driving device where an electro-mechanical transducer such a piezoelectric element is used as a driving source of the driving device (the linear actuator).

Previously, linear actuators (driving devices) using electro-mechanical transducers such as piezoelectric elements, electrostrictive elements, magnetostrictive elements, or the like are used as auto-focus actuators or zoom actuators for use in cameras.

By way of illustration, Japanese Patent No. 2633066 (JP-B 2633066) (which will be also called a first patent document), which corresponds to U.S. Pat. No. 5,225,941, discloses a driving device comprising a driving rod frictionally-engaged with a lens barrel, a piezoelectric element disposed in contact with the driving rod, and a leaf spring for bringing the driving rod into frictional engagement with the lens barrel. That is, the driving rod is bonded to an end of the piezoelectric element in an expansion direction. The lens barrel is movably supported to the driving rod. The leaf spring produces friction between the driving rod and the lens barrel. In the driving device disclosed in JP-B 2633066, a voltage is applied to the piezoelectric element so as to make a speed of expansion of the piezoelectric element different from a speed of contraction thereof.

In addition, Japanese Patent No. 3218851 (JP-B 3218851) (which will be also called a second patent document), which corresponds to U.S. Pat. No. 5,589,723, discloses a driving apparatus comprising a piezoelectric element, a driving member (a driving shaft), coupled to the piezoelectric element, for extending in an expansion direction of the piezoelectric element, and a driven member (a moving member, a lens barrel) having a friction member frictionally coupled to the driving member (the driving shaft). The driving apparatus in JP-B 3218851 drives the lens barrel by devising a driving signal applied to the piezoelectric element. Japanese Patent No. 3180557 (JP-B 3180557) (which will be also called a third patent document), which corresponds also to U.S. Pat. No. 5,589,723, discloses a driving apparatus including the friction member composed of a metal and the driving member made of a fiber-reinforced resin composite.

Japanese Unexamined Patent Application Publication No. 2006-54979 (JP-A 2006-54979) (which will be also called a fourth patent document) discloses an actuator which is capable of moving a driven member with stability and with precision. The actuator disclosed in JP-A 2006-54979 comprises a first piezoelectric element, a diving member mounted to the first piezoelectric element, a driven member which is frictionally coupled to the driving member and which extends in a driving direction, and a second piezoelectric element for engaging the driving member with the driven member and for releasing a friction engagement between the driving member and the driven member. Specifically, the actuator disclosed in JP-A 2006-54979 comprises a pair of first piezoelectric elements for driving, a second piezoelectric element for engagement, a pair of driving members, and a pressure spring. The pair of first piezoelectric elements and the pair of driving members are disposed at both sides with the driven member sandwiched between them. The pair of driving members have a distance which is expanded or narrowed by the second piezoelectric element. By the second piezoelectric element, the friction engagement between the pair of the driving members and the driven member is ensured or released.

Japanese Unexamined Patent Application Publication No. H9-191665 (JP-A 9-191665) (which will be also called a fifth patent document), which corresponds to U.S. Pat. No. 5,890,391, discloses a linear drive mechanism using an electro-mechanical conversion element which is insensitive to elastic deformation of a constituent member. The linear driving mechanism disclosed in JP-A 9-191665 comprises the electro-mechanical conversion element, a working member which is fixedly connected to the electro-mechanical conversion element and which displaces with the electro-mechanical conversion element, a driving member frictionally coupled to the working member, a driven member coupled to the driving member, and a driving pulse generating arrangement for causing expansion/contraction displacement to the electro-mechanical conversion element.

Japanese Unexamined Patent Application Publication No. 2006-304529 (JP-A 2006-304529) (which will be also called a sixth patent document) discloses a high-performance drive device whose cost and weight can be reduced in comparison with a structure with a metal material, and for which a moving member of high rigidity is used without deteriorating the speed of movement and a drive force. In the drive device disclosed in JP-A 2006-304529, the moving member is formed with a liquid crystal polymer including carbon fibers. The drive device disclosed in JP-A 2006-304529 comprises a piezoelectric element for expanding and contracting in response to an applied voltage, a drive shaft (a vibration friction portion) fixed to one end of the piezoelectric element in an expansion/contraction direction, the moving member (a moving portion) which is slidably and frictionally engaged with the drive shaft, and a weight (a stationary member) connected to another end of the piezoelectric element in the expansion/contraction direction. By vibrating the drive shaft by changing a speed or an acceleration of the piezoelectric element in the expansion/contraction direction, the drive device moves the moving member (the moving portion) along the drive shaft (the vibration friction portion). The drive shaft comprises a rod shaft body extending in a linear fashion. The moving member comprises a moving member body and a cap which are engaged with the drive shaft so that both sandwich the drive shaft. In the manner to be movable the moving member along the drive shaft, a substantially U-shaped leaf spring presses the moving member body and the cap against the drive shaft so that a predetermined friction force produces between the drive shaft and the moving member. The moving member body has a groove having a V-shaped cross section. The drive shaft fits in the groove of the moving member body to that two oblique surfaces of the groove come into contact with the drive shaft. Likewise, the cap has a groove having a V-shaped cross section. When the cap is assembled to the moving element body, the drive shaft fits in the groove of the cap so that two oblique surfaces of the groove come into contact with the drive shaft.

Furthermore, Japanese Patent No. 3141714 (JP-B 3141714) (which will be also called a seventh patent-document), which corresponds also to U.S. Pat. No. 5,589,723, discloses a driving device apparatus which is capable of driving a moving member with stability and at high-speed. The driving apparatus disclosed in JP-B 3141714 comprises a stationary member, an electro-mechanical transducer, a driving member (a vibration friction portion), a moving member (a moving portion), and a friction adding arrangement (a plate spring). The electro-mechanical transducer has one end in an expansion/contraction direction that is fixed to the stationary member. The electro-mechanical transducer is applied with a voltage so that the electro-mechanical transducer expands and contracts at different speeds on expanding and on contracting, respectively. The driving member (the vibration friction portion) is connected to another end of the electro-mechanical transducer and is supported so as to move in the expansion/contraction direction of the electro-mechanical transducer. The moving member is frictionally engaged with the driving member and is supported so as to move in the expansion/contraction direction of the electro-mechanical transducer. The friction adding arrangement provides a friction force between the driving member and the moving member. The friction force adding arrangement comprises an elastic member, fixed to the moving member (the moving portion), for generating a pressing force and a sandwiched member (a friction member) for transmitting the pressing force generated by the elastic member to the driving member. In addition, each of a contact portion between the moving member and the driving member and a contact portion between the moving member and the sandwiched member (the friction member) has a V-shaped cross section.

There are problems in the above-mentioned first through forth patent documents as follows.

In the driving device disclosed in the first patent document, inasmuch as the lens holder (the driven member, the moving portion) is movably supported to the guide bar (the driving member, the vibration friction portion) bonded to the piezoelectric element, the guide bar (the driving member, the vibration friction portion) has a length longer than that of the lens holder (the driven member, the moving portion) and the guide bar (the driving member, the vibration portion) is easy to produce an inclination caused by a reciprocating motion. In addition, the longer a moving distance of the lens holder (the driven member, the moving portion), the longer the guide bar (the driving member, the vibration friction member) and it results in easily producing an unnecessary vibration mode. Furthermore, inasmuch as the friction engagement portion lies on an extension of a coupling portion between the piezoelectric element and the guide bar (the driving member, the vibration friction member), it counts against a reduction in profile thereof.

In also the driving apparatus disclosed in the second patent document, inasmuch as the driving shaft (the driving member, the vibration friction portion) extends in an expansion/contraction direction of the electro-mechanical transducer, the driving shaft (the driving member, the vibration friction portion) has a length longer than that of the a zoom lens barrel (the driven member, the moving portion) and the driving shaft (the driving member, the vibration friction portion) is easy to produce an inclination caused by a reciprocating motion. In addition, the longer a moving distance of the zoom lens barrel (the driven member, the moving portion), the longer the driving shaft (the driving member, the vibration friction portion) and it results in easily producing an unnecessary vibration mode. Furthermore, inasmuch as the friction engagement portion lies on an extension of a coupling portion between the electro-mechanical transducer and the driving shaft (the driving member, the vibration friction member), it counts against a reduction in profile thereof. In addition, inasmuch as the driving apparatus has structure where the zoom lens barrel (the driven member, the moving portion) is cantilevered by the driving shaft (the driving member, the vibration friction portion), it is impossible to mechanically move a large weight object such as the lens.

The third patent document may just disclose the driving apparatus where the driving shaft (the driving member, the vibration friction portion) is made of the fiber-reinforced resin composite and has a basic structure which is similar to that illustrated in the second patent document. It has therefore disadvantage which is similar to that of the second patent document.

Although the driving member (the vibration friction portion) has a length which is shorter than that of the driven member (the moving portion) in the actuator disclosed in the fourth patent document, the actuator disclosed in the fourth patent document is disadvantageous in that it is complicated in structure and it is impossible to reduce a size thereof because it comprises a plurality of piezoelectric elements.

On the other hand, the fifth patent document discloses the linear drive mechanism where the moving member (the moving portion) has a rod shape and the working member (a vibration friction portion) has a complicated shape. However, the fifth patent document neither discloses nor teaches a length of the working member in a sliding direction.

With structure in the sixth patent document, it is difficult to shorten a length of the frictionally coupled portion between the driving shaft (the vibration friction portion) and the moving member (the moving portion) (i.e. a length of moving member in a sliding direction). It is therefore difficult to reduce the height (size) of the drive device.

In the driving apparatus disclosed in the seventh patent document, in the similar as a case of the drive device disclosed in the sixth patent document, the driving member (the vibration friction portion) comprises a driving shaft extending in the expansion/contraction direction of the electro-mechanical transducer and the moving member (the moving portion) comprises a slider which is frictionally in contact with the driving shaft. Therefore, in the similar manner as a case of the drive device disclosed in the sixth patent document, with the driving apparatus disclosed in the seventh patent document, it is difficult to shorten a length of the frictionally coupled portion between the driving member (the vibration friction portion) and the moving member (the moving portion) (i.e. a length of the slider in a sliding direction). The driving apparatus disclosed in the seventh patent document is disadvantageous in that it is difficult to reduce the height (size) of the driving apparatus. In addition, in the driving apparatus disclosed in the seventh patent document, the sandwiched member (the friction member) is pressed against the driving shaft (the vibration friction portion) by means of the elastic member (the leaf spring).

At any rate, any of the first through the seventh patent documents neither considers nor takes whether or not it is better what length is the frictionally coupled portion into consideration in order to rapidly move the moving member (the moving portion) with stability.

SUMMARY OF THE INVENTION

It is therefore an exemplary object of the present invention to provide a driving device which is capable of reducing the height thereof.

It is another exemplary object of the present invention to provide a driving device which is capable of increasing a moving speed of a moving portion thereof.

Other objects of this invention will become clear as the description proceeds.

On describing the gist of an exemplary aspect of this invention, it is possible to be understood that a driving device includes an electro-mechanical transducer having first and second end portions opposite to each other in an expansion/ contraction direction, a static member coupled to the first end portion of the electro-mechanical transducer, a vibration friction portion mounted to the second end portion of the electro-mechanical transducer, and a rod-shaped moving portion frictionally coupled to the vibration friction portion. The rod-shaped moving portion is movable in the expansion/contraction direction of the electro-mechanical transducer. According to the exemplary aspect of this invention, the vibration friction portion has a length in a sliding direction in contact with the moving portion that is not more than 1.15 mm.

DESCRIPTION OF THE PREFERRED EMBODIMENTS

Figure 1:
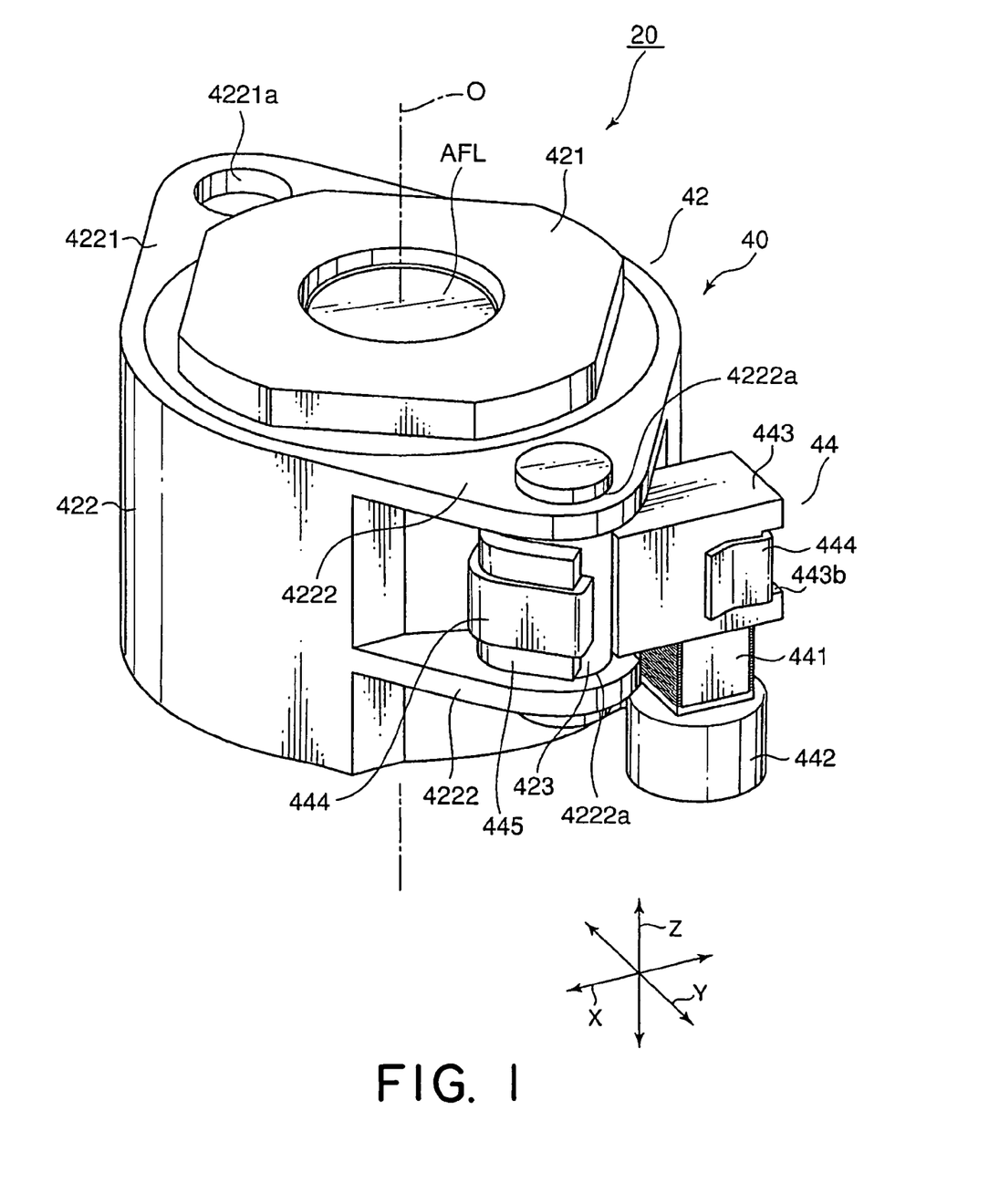
FIG. 1 is an external perspective view showing a driving device according to a first exemplary embodiment of this invention.

FIG. 1 is an external perspective view of a driving device 20 according to a first exemplary embodiment of this invention. Herein, in the manner shown in FIG. 1, an orthogonal coordinate system (X, Y, Z) is used. In a state illustrated in FIG. 1, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIG. 1, the up-and-down direction Z is a direction of an optical axis O of a lens.

The driving device 20 is covered with a cabinet (not shown). The cabinet includes a cap-shaped upper cover (not shown) and a lower base (not shown). On the lower base of the cabinet, a stationary member (a weight) 442 which will later be described is mounted. The upper cover has an upper surface comprising a cylinder portion (not shown) having a center axis which is the optical axis O.

On the other hand, although illustration is not made, the lower base had a central portion in which an image pickup device disposed on a substrate is mounted. The image pickup device picks up a subject image formed by an movable lens (which will later be described) to convert it into an electric signal. The image pickup device may, for example, comprise a CCD (charge coupled device) type image sensor, a CMOS (complementary metal oxide semiconductor) type image sensor, or the like.

The illustrated driving device 20 comprises an auto-focus lens driving unit 40.

In the cabinet, a guide shaft (not shown) is disposed at a left and back side. The guide shaft extends in parallel with the optical axis O. The guide shaft has an upper end which is fixed to the upper surface of the upper cover of the cabinet and a lower end which is fixed to the lower base of the cabinet. With the optical axis O sandwiched, a rod-shaped moving portion (a movable shaft) 423, which will later be described, is disposed at a right and front side which is opposite side with respect to the guide shaft. That is, the guide shaft and the moving shaft 423 are disposed at positions which are rotationally symmetric about the optical axis O.

The auto-focus lens driving unit 40 comprises a lens movable portion 42 and a lens driving portion 44. The lens movable portion 42 includes a lens holding frame 421 for holding an auto-focus lens AFL which is the movable lens. The lens holding frame 421 is fixed on an upper portion of a movable barrel 422 having a substantially cylindrical shape. The movable barrel 422 comprises a pair of extending portions (however, an upper side thereof is only illustrated in FIG. 1) 4221 which extend in a radial direction outwards at the left and back side. The pair of extending portions 4221 have through holes 4221a through which the above-mentioned guide shaft passes. In addition, the movable barrel 422 comprises a pair of extending portions 4222 which extend in the radial-direction outwards at the right and front side. The pair of extending portions 4222 have fitting holes 4222a through which the rod-shaped movable shaft 423 passes and to which the rod-shaped moving shaft 423 is fixed. With this structure, the lens movable portion 42 is movable in the direction of the optical axis O with respect to the cabinet.

The lens driving portion 44 slidably supports the lens movable portion 42 in the direction of the optical axis O and drives the lens movable portion 42 in the manner which will later be described.

Figure 2:
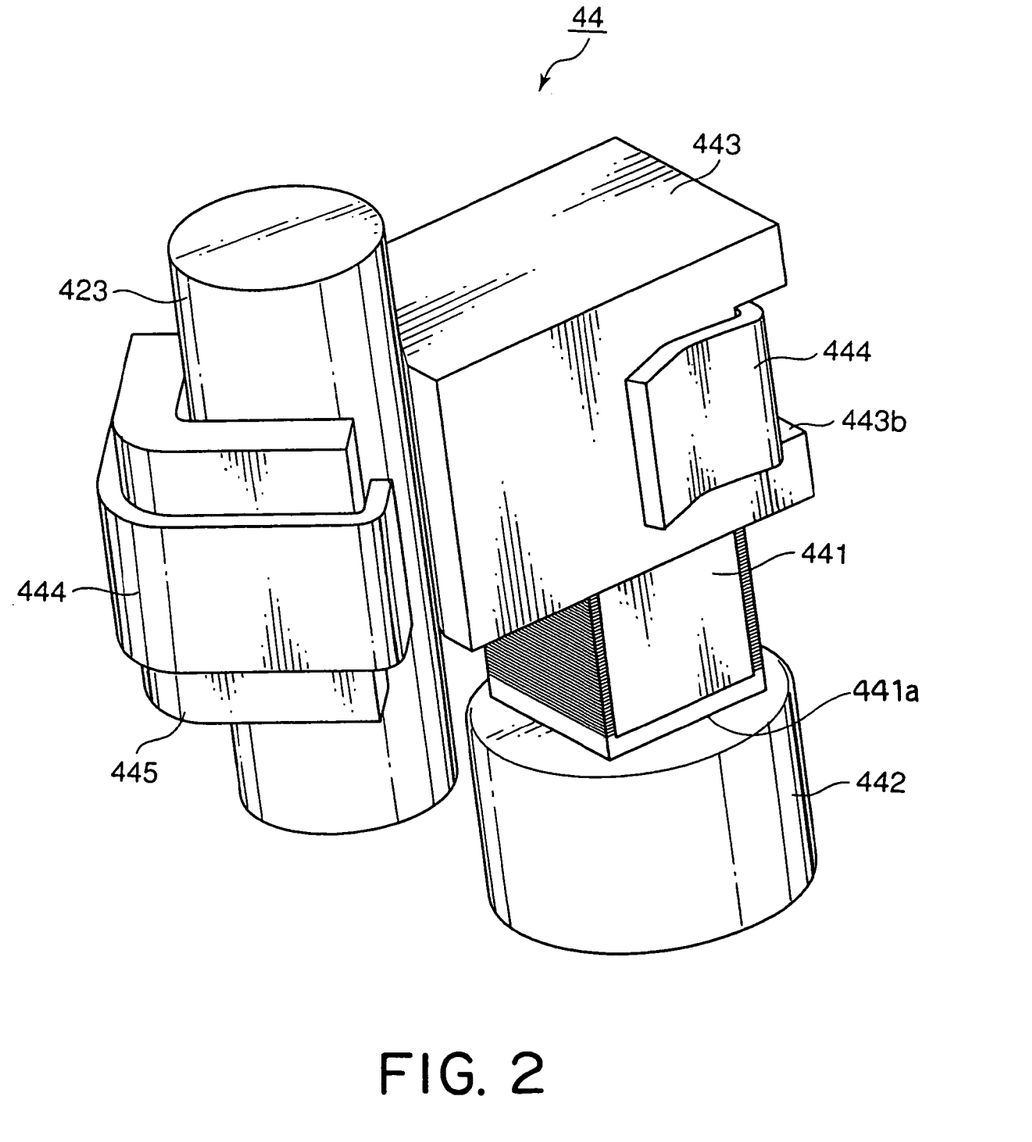
FIG. 2 is a perspective view showing a lens driving portion of the driving device illustrated in FIG. 1 together with a rod-shaped moving shaft.
Figure 3:
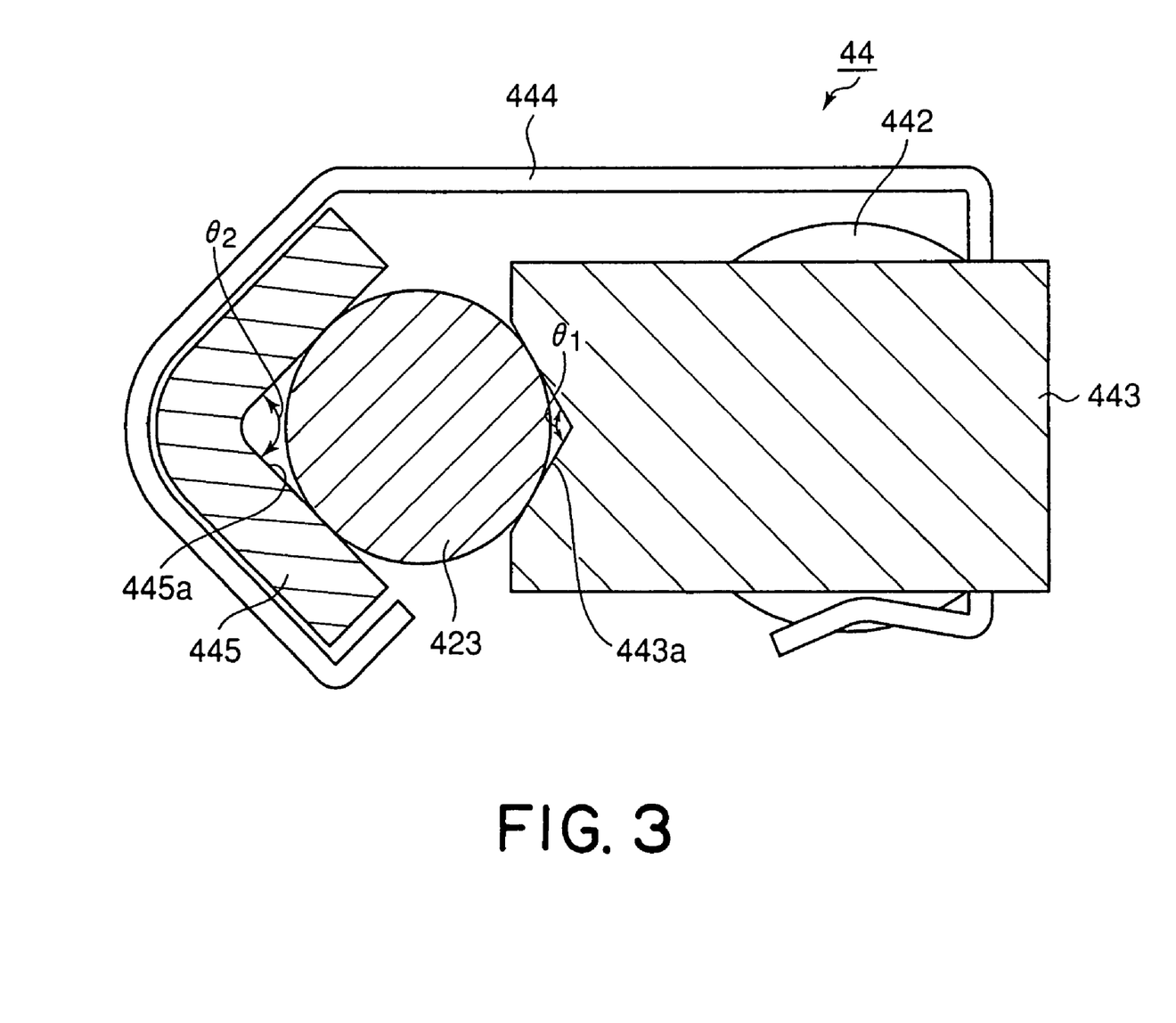
FIG. 3 is a plan view showing the lens driving portion of the driving device illustrated in FIG. 2 together with the rod-shaped moving shaft.
Figure 4:
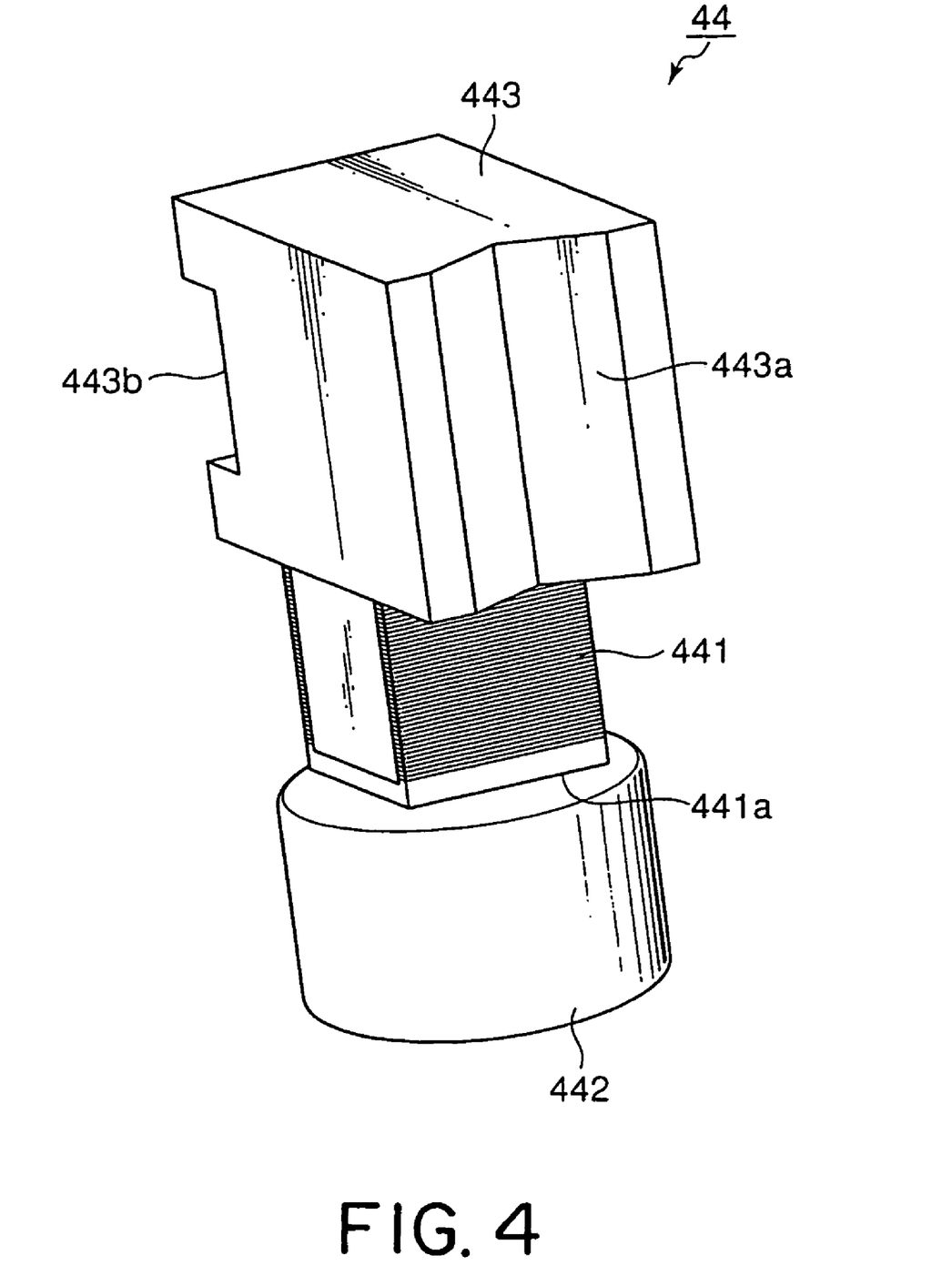
FIG. 4 is a perspective view showing a main portion of the lens driving portion illustrated in FIG. 2.

Referring to FIGS. 2 through 4 in addition to FIG. 1, the description will proceed to the lens driving portion 44 of the auto-focus lens driving unit 40. FIG. 2 is a perspective view showing the lens driving portion 44 of the auto-focus lens driving unit 40 together with the rod-shaped moving shaft 423. FIG. 3 is a plan view showing the lens driving portion 44 of the auto-focus lens driving unit 40 together with the rod-shaped moving shaft 423. FIG. 4 is a perspective view showing a main portion of the lens driving portion 44.

Figure 5:
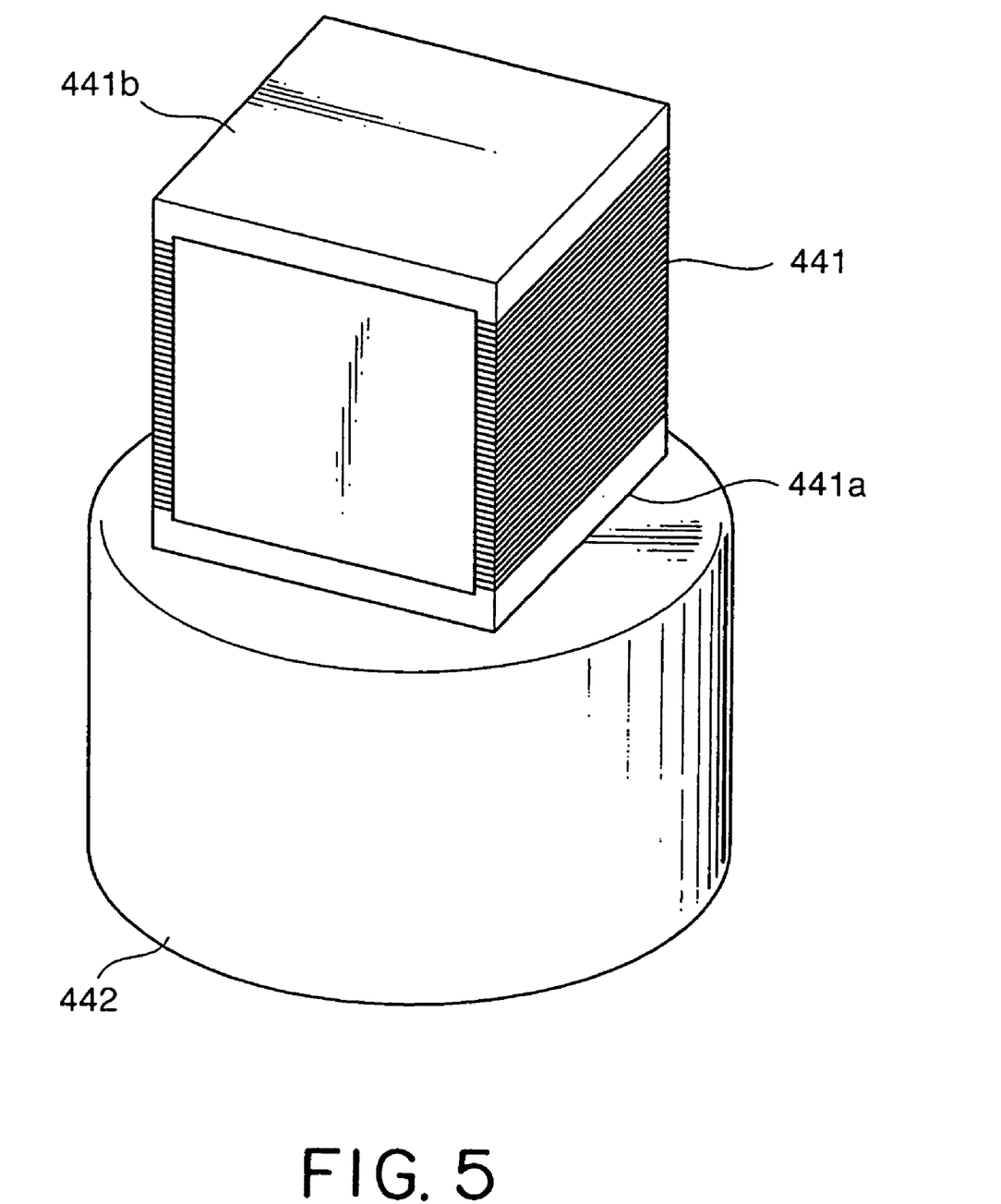
FIG. 5 is a perspective view showing an piezoelectric unit for use in the lens driving portion illustrated in FIG. 2.

The lens driving portion 44 comprises a laminated piezoelectric element 441 serving as an electro-mechanical transducer, the stationary member (the weight) 442, and a vibration friction portion 443. The laminated piezoelectric element 441 expands and contracts in a direction of the optical axis O. The laminated piezoelectric element 441 has a structure where a plurality of piezoelectric layers are laminated in the direction of the optical axis O. As shown in FIG. 5, the laminated piezoelectric element 441 has a first end portion (a lower end portion) 441a and a second end portion (an upper end portion) 441b which are disposed to each other in the expansion/contraction direction. The stationary member (the weight) 442 is coupled to the first end portion (the lower end portion) 441a of the laminated piezoelectric element 441 using an adhesive agent or the like. The vibration friction portion 443 is mounted to the second end portion (the upper end portion) 441b of the laminated piezoelectric element 441 using the adhesive agent or the like. Although the vibration friction portion 443 is directly coupled to the second end portion 441b of the laminated piezoelectric element 441, any member may be sandwiched between the vibration friction portion 443 and the second end portion 441b of the laminated piezoelectric element 441.

In addition, as shown in FIG. 5, a combination of the laminated piezoelectric element 441 and the static member 442 is called an piezoelectric unit.

The rod-shaped moving shaft 423 is frictionally coupled to the vibration friction portion 443. As shown in FIGS. 3 and 4, the vibration friction portion 443 has a groove (a friction engagement surface) 443a which is a V-shape in cross section at a friction coupling portion between the vibration friction portion 443 and the rod-shaped moving shaft 423.

The lens driving portion 44 comprises a spring 444 for pressing (urging) the rod-shaped moving shaft 423 against the vibration friction portion 443. That is, the spring 444 serves as an urging arrangement which is fixed to the vibration friction portion 443 and which generates a pressing force for pressing the moving shaft 423. Between the spring 444 and the rod-shaped moving shaft 423, a pad 445 having a V-shaped structure is sandwiched. The pad 445 is disposed so as to be opposed to the vibration friction portion 443 with the moving shaft 423 sandwiched therebetween. In the manner which is similar to the vibration friction portion 443, the pad 445 also has a groove 445a which is a rod-shaped moving shaft 423. The vibration friction portion 443 has a groove 443b for holding the spring 444. The spring 444 has a first end portion which is engaged with the vibration friction portion 443 at the groove 443b and a second end portion which extends towards the moving shaft 423. Therefore, the vibration friction portion 443 and the pad 445 are pressed against the rod-shaped moving shaft 423 by the spring 444. As a result, the rod-shaped moving shaft 423 is frictionally coupled to the vibration friction portion 443 with stability.

More specifically, the pad 445 is sandwiched between the moving portion 423 and the spring 444. The pad 445 is for preventing the pressing force of the spring 444 from degrading due to the wearing away of friction thereof and for preventing the friction force from changing due to wearing away of friction of the spring 444. In addition, in order to prevent the pad 444 from wearing way of friction thereof, the pad 444 may desirably have a smoothed surface. This is purpose, it is desirable that the pad 444 may be made of a material which is one selected from the group consisting of firm metal, resin, and a fiber-reinforced resin composite.

In addition, in the vibration friction portion 443, a frictionally coupled portion between the vibration friction portion 443 and the moving portion 423 has the V-shaped groove 443a in cross section. Inasmuch as the V-shaped groove 443a of the vibration friction portion 443 and the moving portion 423 come in contact with each other in line contact of two straight liens, advantages according to the driving device 20 are that the frictionally coupled portion is put into a stable contact state to obtain friction driving having good reproducibility, and it is possible to enhance rectilinear mobility of the moving portion 423 as a single-shaft mobile unit. In addition, it is desirable that the V-shaped groove 443a of the vibration friction portion 443 has a first angle $\theta_1$ which lies in a range of 30 degrees, inclusive, to 180 degrees, exclusive.

Furthermore, the pad 445 has a V-shaped structure having the V-shaped groove 445a in cross section. Inasmuch as the V-shaped groove 445a of the pat 445 and the moving portion 423 come in contact with each other in line contact of two straight liens, advantages according to the driving device 20 are that the frictionally coupled portion is put into a stable contact state to obtain friction driving having good reproducibility, and it is possible to enhance rectilinear mobility of the moving portion 423 as the single-shaft mobile unit. In addition, it is desirable that the V-shaped groove 445a of the pad 445 has a second angle $\theta_2$ which lies in a range of 30 degrees, inclusive, to 180 degrees, exclusive.

The vibration friction portion 443 and the pad 445 are pressed against the moving portion 423 by the spring 444. As a result of this, inasmuch as the V-shaped groove 443a of the vibration friction portion 443 and the V-shaped groove 445a of the pad 445 are pressed against the moving portion 423, it is possible to make three parts (the moving portion 423, the vibration friction portion 443, and the pad 445) stable line contact. In addition, it is desirable that the pressing force of the spring 444 lies in a range between 5 and 100 gf, both inclusive.

The lens driving portion 44 and the lens moving portion 42 are disposed in parallel with each other in the optical axis O as shown in FIG. 1. Accordingly, it is possible to lower a height of the auto-focus lens driving unit 40. As a result, it is possible to also lower a height of the driving device 20.

Figure 6A:
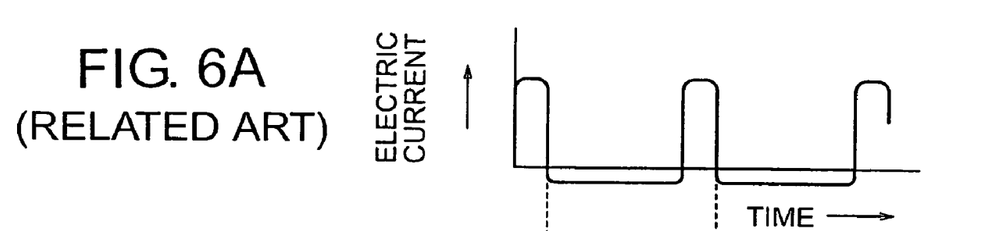
FIG. 6A is a waveform diagram for use in describing a current supplied to a laminated piezoelectric element.
Figure 6B:
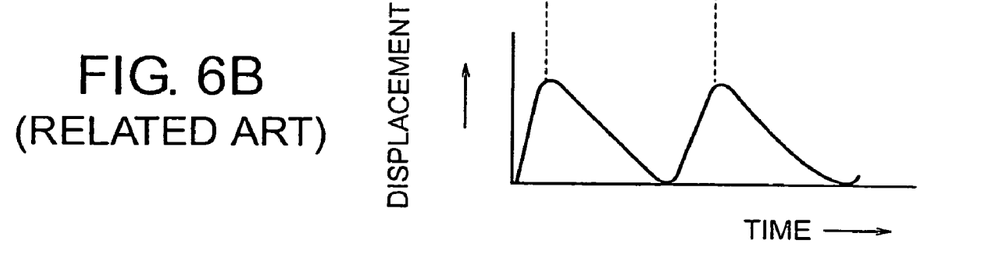
FIG. 6B is a waveform diagram for use in describing displacements generated by the laminated piezoelectric element.

Referring now to FIGS. 6A and 6B, the description will proceed to an electric current supplied to the laminated piezoelectric element 441 and displacements generated in the laminated piezoelectric element 441. FIGS. 6A and 6B are similar to those illustrated in FIG. 5 of the above-mentioned JP-B 3218851 (the second Patent Document) which corresponds to FIGS. 8(a) and 8(b) of U.S. Pat. No. 5,589,723. FIG. 6A shows a change of the electric current supplied to the laminated piezoelectric element 441 by a driving circuit (not shown) and FIG. 6B shows the displacements of the laminated piezoelectric element 441.

As shown in FIG. 6A, a large current (in a positive or forward direction) and a constant current (in a negative or reverse direction) flow alternately through the laminated piezoelectric element 441. Under the circumstances, the laminated piezoelectric element 441 produces alternately a rapid displacement (expansion) corresponding to the large current (positive or forward) and a slow displacement (contraction) corresponding to the constant current (negative or reverse), as shown in FIG. 6B.

That is, by applying a rectangular current to the laminated piezoelectric element 441 (FIG. 6A), it makes the laminated piezoelectric element 441 produce sawtooth displacements (expansion and contraction) (FIG. 6B).

Referring to FIG. 1 in addition to FIGS. 6A and 6B, the description will be made as regards operation of the auto-focus lens driving unit 40. First, the description will presently be made as regards operation in a case where the lens movable portion 42 moves along the up-and-down direction Z downwards.

It will now be assumed that the large current flows to the laminated piezoelectric element 441 in the positive or forward direction as shown in FIG. 6A. In this event, the laminated piezoelectric element 441 rapidly produces the expansion displacement in the thickness direction as shown in FIG. 6B. As a result, the vibration friction portion 443 rapidly moves along the direction of the optical axis O (the up-and-down direction Z) upwards. In this event, the lens movable portion 42 does not moves. This is because, caused by the inertial force, the lens movable portion 42 substantially remains in its position by overcoming the friction force between the vibration friction portion 443 and the rod-shaped moving shaft 423.

Subsequently, it will be assumed that the constant current flows the laminated piezoelectric element 441 in the negative or reverse direction as shown in FIG. 6A. In this event, the laminated piezoelectric element 441 slowly produces the contraction displacement in the thickness direction as shown in FIG. 6B. As result, the vibration friction portion 443 slowly moves along the direction of the optical axis O (the up-and-down direction Z) downwards. In this event, the lens movable portion 43 substantially moves along the direction of the optical axis O (the up-and-down direction Z) downwards together with the vibration friction portion 443. This is because the vibration friction portion 443 and the rod-shaped moving portion 423 come into surface contact with each other and are coupled to each other due to the friction force generating in the contact surfaces.

In the manner which is described above, by alternately flowing the large current (the positive or forward direction) and the constant current (the negative or reverse direction) through the laminated piezoelectric element 441 to make the laminated piezoelectric element 441 alternately produce the expansion displacement and the contraction displacement, it is possible to continuously move the lens holder 421 (the lens movable portion 42) along the direction of the optical axis O (the up-and-down direction Z) downwards.

It will be assumed that it makes the lens movable portion 42 along the direction of the optical axis O (the up-and-down direction Z) upwards. Conversely, this is obtained by alternately flowing the large current (the negative or reverse direction) and the constant current (the positive or forward direction) through the laminated piezoelectric element 441.

Now, the description will proceed to the laminated piezoelectric element 441. The laminated piezoelectric element 441 has a rectangular parallelepiped shape having an element size of 0.9 mm×0.9 mm×1.5 mm. The piezoelectric material is made of a material having a low Qm such as lead-zirconate-titanate (PZT). The laminated piezoelectric element 441 is manufactured by alternately laminating the piezoelectric materials each having a thickness of 20 microns and the internal electrodes each having a thickness of 2 microns in a corn fashion by fifty layers. In addition, the laminated piezoelectric element 441 has the effective internal electrode size of 0.6 mm×0.6 mm. In other wards, at a peripheral portion positioned the outside of the effective internal electrode of the laminated piezoelectric element 441, there is a ring-shaped dead area (clearance) of a width of 0.15 mm.

Figure 7:
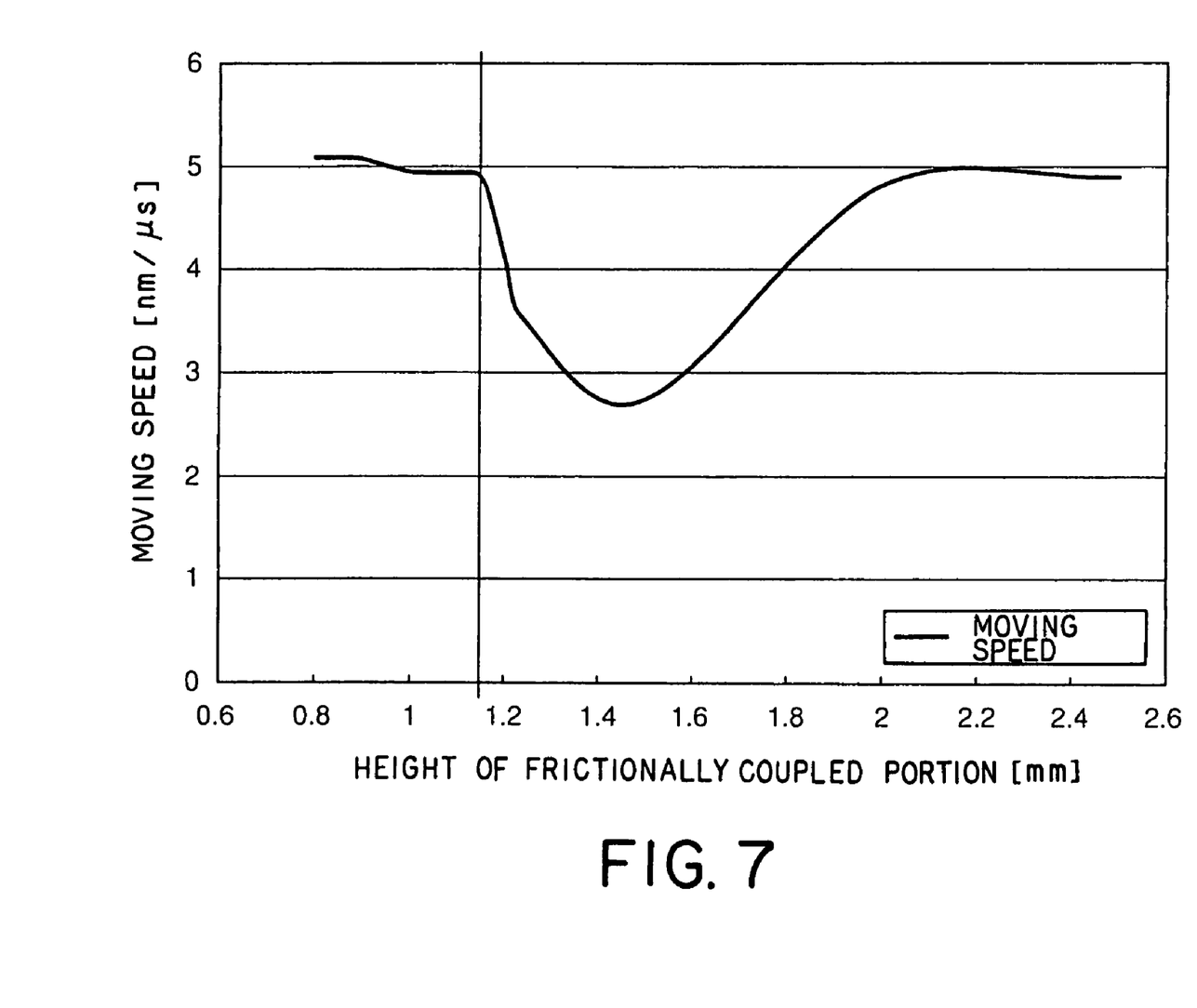
FIG. 7 is a graph showing variations of a moving speed of a moving portion when a size of a height of a frictionally coupled portion (a length of a vibration friction portion in a sliding direction in contact with the moving portion) is changed.

FIG. 7 is a graph showing variations of a moving speed of the moving portion 423 when a size of a height H of the frictionally coupled portion (a length of the vibration friction portion 443 in a sliding direction in contact with the moving portion 423) is changed. In FIG. 7, the abscissa represents the height H [mm] of the frictionally coupled portion [mm] and the ordinate represents the moving speed [nm/μm] of the moving portion 423. In FIG. 7, a thin solid line represents a position where the height H of the frictionally coupled portion is equal to 1.15 mm.

From FIG. 7, it is seen that the moving speed of the moving portion 423 lowers in a range between 1.15 mm and 2.0 mm of the height H of the frictionally coupled portion and the moving portion 423 has a fast moving speed with stability at a size of the frictionally coupled portion other than this range. There is no difference in performance between a range where the height H of the frictionally coupled portion is not more than 1.15 mm and a range where the height H of the frictionally coupled portion is not less than 2.0 mm. However, height reduction is essential in a case where the driving device 20 is mounted on a compact product such as a camera module. Accordingly, the exemplary embodiment of this invention sets the height H of the frictionally coupled portion at 1.15 mm or less.

In the manner which is described above, inasmuch as the height H of the frictionally coupled portion (the length of the vibration friction portion 443 in the sliding direction in contact with the moving portion 423) is set at 1.15 mm or less, it is possible to make the moving speed of the moving portion 423 fast and to reduce the height of the driving device 20.

That the moving speed of the moving portion 423 is fact means that moving efficiency is high. Inasmuch as the moving efficiency is high, it is possible to complete a predetermined operation at a short time interval. In other words, it is possible to operate the driving device 20 at high velocity. It will be assumed that the moving speed of the moving portion 423 is sufficiently faster than a required operation use speed. Under the circumstances, it is possible to lower power consumption by decreasing the moving speed of the moving portion 423. Furthermore, inasmuch as it is possible to limit performance of the electro-mechanical transducer (the laminated piezoelectric element) 441 and other parts, it is possible to cut down on the cost of the driving device 20.

Figure 8:
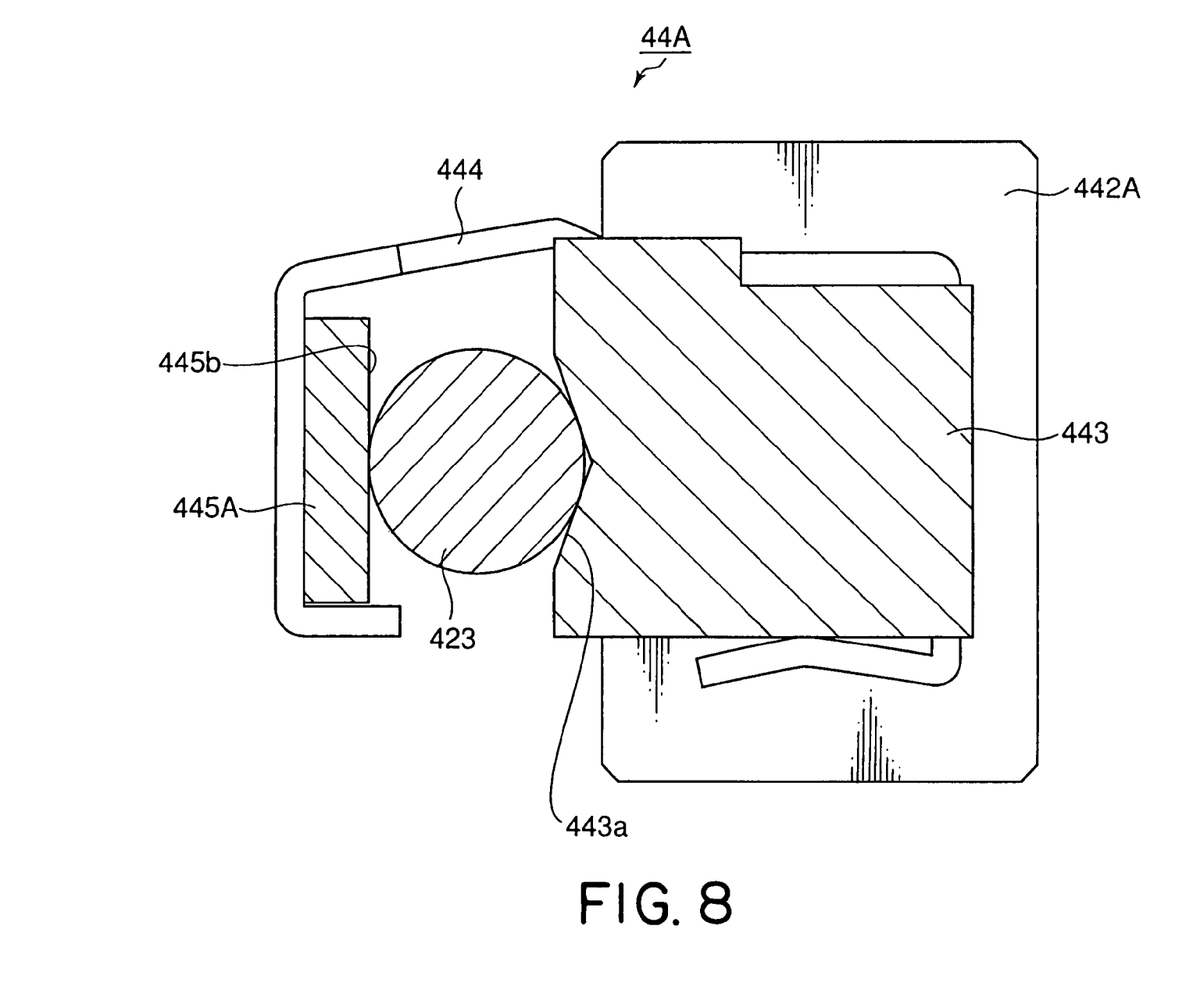
FIG. 8 is a plan view showing a lens driving portion of a driving device according a second exemplary embodiment of this invention together with a rod-shaped moving shaft.

FIG. 8 is a plan view showing a lens driving portion 44A of a driving device according a second exemplary embodiment of this invention together with the rod-shaped moving shaft 423. The illustrated lens driving portion 44A comprises a pad 445A which has a flat structure having a plane surface 445b at a contact portion between the pad 445A and the rod-shaped moving shaft 423. In addition, an illustrated stationary member (weight) 442A has a rectangular parallelepiped shape.

According to the lens driving portion 44A having such structure, inasmuch as the V-shaped groove 443a of the vibration friction portion 443 and the moving portion 423 come in contact with each other in line contact of two straight lines and as the plane surface 445b of the pat 445A and the moving portion 423 come in contact with each other in line contact of one straight lien, advantages according to the driving device are that the frictionally coupled portion is put into a stable contact state to obtain friction driving having good reproducibility, and it is possible to enhance rectilinear mobility of the moving portion 423 as the single-shaft mobile unit.

In the exemplary aspect of this invention, the driving device further may comprise a friction force adding arrangement for generating a friction force between the vibration friction portion and the moving portion. In this event, the friction force adding arrangement desirably may comprise an urging member, fixed to the vibration friction portion, for generating a pressing force for pressing the moving portion against the vibration friction portion, and a pad which is disposed so as to be opposed to the vibration friction portion via the moving portion and which is sandwiched between the urging member and the moving portion. The urging member may comprise, for example, a spring which has a first end portion engaged with the vibration friction portion and a second end portion extending to the moving portion side. In this event, the vibration friction portion preferably may have a V-shaped groove in cross section at a frictionally coupled portion between the vibration friction portion and the moving portion. The V-shaped groove of the vibration friction portion desirably may have an angle which lies in a range of 30 degrees, inclusive, to 180 degrees, exclusive. The pressing force of the spring desirably may lie a range between 5 and 100 gf, both inclusive. The pad preferably may have a V-shaped structure having a V-shaped groove in cross section at a contact portion between the pad and the moving portion. The V-shaped groove of the pad desirably may have an angle which lies in a range of 30 degrees, inclusive, to 180 degrees, exclusive. Alternatively, the pad may have a flat structure having a plane surface at a contact portion between the pad and the moving portion.

An exemplary advantage according to the invention is that it is possible to achieve height reduction of the driving device and to make the moving speed of the moving portion fast. This is because the length of the vibration friction portion in the sliding direction in contact with the moving portion is 1.15 mm or less.

While this invention has been particularly shown and described with reference to exemplary embodiments thereof, the invention is not limited to these embodiments. It will be understood by those of ordinary skill in the art that various changes in form and details may be therein without departing from the spirit and scope of the present invention as defined by the claims.

What is claimed is:

1. A driving device comprising:
    an electro-mechanical transducer having first and second end portions opposite to each other in an expansion/contraction direction;
    a stationary member coupled to the first end portion of said electro-mechanical transducer;
    a vibration friction portion mounted to the second end portion of said electro-mechanical transducer; and
    a rod-shaped moving portion frictionally coupled to said vibration friction portion, said moving portion being movable in the expansion/contraction direction of said electro-mechanical transducer,
    wherein said vibration friction portion has a length in a sliding direction in contact with said moving portion that is not more than 1.15 mm.

2. The driving device as claimed in claim 1, wherein said driving device further comprises a friction force adding arrangement for generating a friction force between said vibration friction portion and said moving portion,
    wherein said friction force adding arrangement comprises:
    an urging member, fixed to said vibration friction portion, for generating a pressing force for pressing said moving portion against said vibration friction portion; and
    a pad disposed so as to be opposed to said vibration friction portion via said moving portion, said pad being sandwiched between said urging member and said moving portion.

3. The driving device as claimed in claim 2, wherein said urging member comprises a spring which has a first end portion engaged with said vibration friction portion and a second end portion extending to said moving portion side,
    wherein said vibration friction portion has a V-shaped groove in cross section at a frictionally coupled portion between said vibration friction portion and said moving portion.

4. The driving device as claimed in claim 3, wherein the V-shaped groove of said vibration friction portion has an angle which lies in a range of 30 degrees, inclusive, to 180 degrees, exclusive.

5. The driving device as claimed in claim 3, wherein the pressing force of said spring lies in a range between 5 and 100 gf, both inclusive.

6. The driving device as claimed in claim 3, wherein said pad has a V-shaped structure having a V-shaped groove in cross section at a contact portion between said pad and said moving portion.

7. The driving device as claimed in claim 6, wherein the V-shaped groove of said pad has an angle which lies in a range of 30 degrees, inclusive, to 180 degrees, exclusive.

8. The driving device as claim in claim 3, wherein said pad has a flat structure having a plane surface at a contact portion between said pad and said moving portion.

* * * * *